(12) United States Patent
Komata

(10) Patent No.: US 7,027,034 B2
(45) Date of Patent: Apr. 11, 2006

(54) METHOD OF MOVING OBJECTS ON TV MONITOR, THE COMPUTER AND RECORDING MEDIUM FOR EXECUTING THE METHOD

(75) Inventor: Nobuhiro Komata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 298 days.

(21) Appl. No.: 09/757,814

(22) Filed: Jan. 10, 2001

(65) Prior Publication Data

US 2001/0013858 A1 Aug. 16, 2001

(30) Foreign Application Priority Data

Jan. 14, 2000 (JP) ....................................... 2000-040255

(51) Int. Cl.
*G09G 5/08* (2006.01)

(52) U.S. Cl. ........................ 345/159; 345/467; 345/672; 463/37

(58) Field of Classification Search ................. 345/159, 345/467, 672; 463/37
See application file for complete search history.

(56) References Cited

U.S. PATENT DOCUMENTS

| 5,673,066 A | | 9/1997 | Toda et al. |
| 5,889,236 A | | 3/1999 | Gillespie et al. |
| 5,943,044 A | * | 8/1999 | Martinelli et al. .......... 345/174 |
| 6,344,791 B1 | * | 2/2002 | Armstrong .................. 338/114 |

FOREIGN PATENT DOCUMENTS

TW  288636  10/1996

* cited by examiner

*Primary Examiner*—Mark Zimmerman
*Assistant Examiner*—Adam Arnold
(74) *Attorney, Agent, or Firm*—Katten Muchin Zavis Rosenman

(57) ABSTRACT

The movement of an object due to the continuous pushing of a simple ON/OFF switch is made an easier-to-use interface for users by a method of moving an object displayed on a screen of a TV monitor of a computer having a controller which has a pressure-sensitive unit. In the method, the pushing by a user on the controller is sensed by the pressure-sensitive unit, a pressure-sensing output signal is determined depending on the pushing pressure, and the object is moved within the screen of the TV monitor depending on the magnitude of the pressure-sensing output signal of the controller.

16 Claims, 18 Drawing Sheets

| PRESSURE-SENSING VALUE | VELOCITY COEFFICIENT |
|---|---|
| 0 ~ 5 | 1 |
| 6 | E 1 |
| 7 | E 2 |
| ⋮ | ⋮ |
| 2 5 5 | E 2 5 5 |

FIG. 4A

| PRESSURE-SENSING VALUE | VELOCITY COEFFICIENT |
|---|---|
| 0 ~ 5 | 1 |
| 6 | F 1 |
| 7 | F 2 |
| ⋮ | ⋮ |
| 2 5 5 | F 2 5 5 |

FIG. 4B

METHOD OF MOVING OBJECTS ON TV MONITOR, THE COMPUTER AND RECORDING MEDIUM FOR EXECUTING THE METHOD

FIELD OF THE INVENTION

The present invention relates to a method of moving objects on a TV monitor of the computer, for example for playing a game on an entertainment system, at a movement velocity depending on the value of a pressure-sensed value of pushing a controller button by a user, and a computer and recording medium for executing same.

BACKGROUND OF THE INVENTION

Currently, video games wherein positions of objects and the like in three-dimensional coordinates are calculated in real time, subjected to perspective transformation into two dimensions, and texture is mapped to the objects subjected to perspective transformation in polygon units, have become the mainstream. When the user operates a controller, the objects may be moved based on this operation, or the position of the point of view may be switched depending thereupon, so the objects and backgrounds and the like viewed from the position of the point of view are found by calculation, and based upon the processing, these are displayed as a two-dimensional image on the screen of a television monitor.

When ON/OFF switches on the controller connected to the video game machine are turned ON continuously, namely when they are pushed and held, the movement of objects is performed continuously.

For example, a pressure-sensitive type controller was disclosed in the publication of examined Japanese utility model application No. JP-B-H1-40545, wherein pressure-sensitive output is provided as input to a VCO (variable control oscillator) and the output of the VCO is used for repeated fire in a game.

In addition, Japanese patent No. 2524475 discloses making a character perform a jump action in response to a pressure-sensed output and the like.

SUMMARY OF THE INVENTION

It is object of the present invention to make movement of objects by the continuous pushing of a simple ON/OFF switch into an easier-to-use interface for users. This and other objects of the present invention are attained by a recording medium on which is recorded a computer-readable and executable program that performs processing by taking as instructions the output from a controller which has pressure-sensitive means, wherein the software program comprises a processing program that moves an object within a screen, depending on the output of the controller.

The objects of the invention are further achieved by a method of moving an object displayed on the monitor of the computer having a controller which has pressure-sensitive means, comprising the steps of: sensing the pushing pressure on the controller, by the pressure-sensitive means, determining a pressure-sense output signal depending on the pushing pressure, and moving the object within the screen, depending on the magnitude of the pressure-sensed output signal.

The objects of the present invention are also achieved by a computer having a controller which has pressure-sensitive means, comprising: means of sensing the pushing pressure on the controller, means of determining a pressure-sensed output signal depending on the pushing pressure by a user, and means of moving the object within the screen displayed on the monitor depending on the magnitude of the pressure-sensed output signal.

BRIEF DESCRIPTION OF THE DRAWINGS

FIG. 4A shows a table wherein velocity coefficients $E_1$–$E_{255}$ are defined depending on pressure-sense values in the case of moving an object;

FIG. 4B shows a table wherein velocity coefficients $F_1$–$F_{255}$ are defined depending on pressure-sense values in the case of causing an object to jump;

DETAILED DESCRIPTION OF THE PREFERRED EMBODIMENTS

Here follows a description of an embodiment of the method of moving objects at a movement velocity depending on the value of a pressure-sense value, and computer and recording medium for executing same according to the present invention, in detail with reference to the appended drawings.

In this embodiment, objects are moved at a movement velocity depending on the value of a pressure-sense value, so it is possible to provide a system with a user interface that is improved in comparison to a system wherein objects are moved at a set velocity based on the pushing of a simple ON/OFF switch or the continuous pushing thereof.

Figure 1:
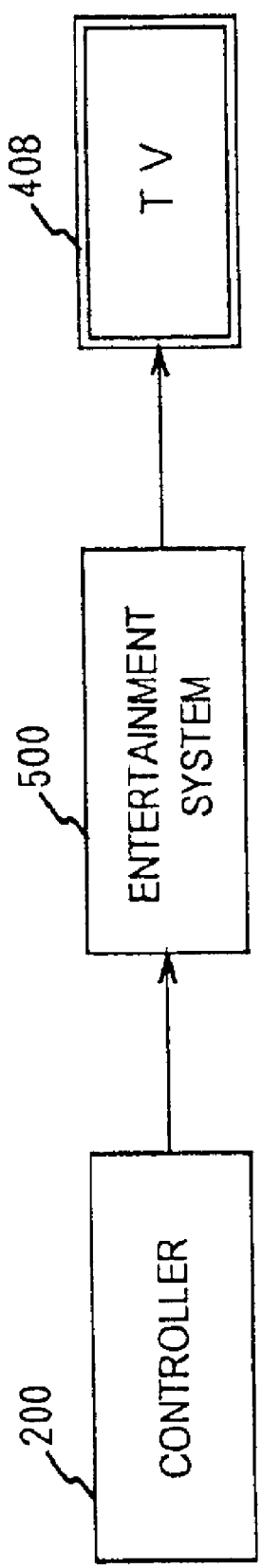
FIG. 1 is a schematic diagram of an example of connecting an entertainment system to a TV monitor to enable a user to enjoy game software or videos.
Figure 6:
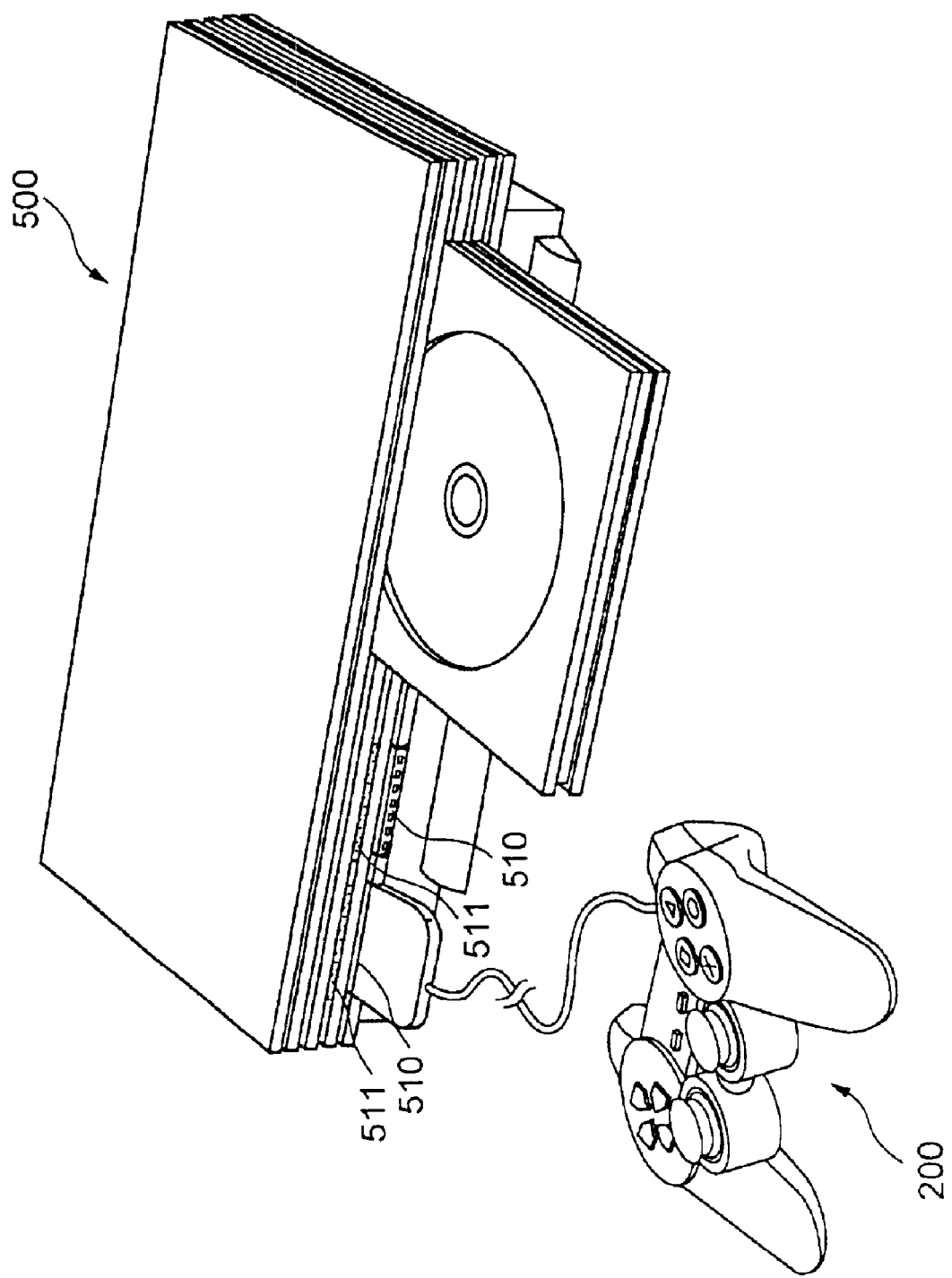
FIG. 6 is a perspective view of the controller connected to the entertainment system.

FIG. 1 is a schematic diagram showing the connection of an entertainment system 500 to a TV monitor 408, to enable a user to enjoy game software or video. More specifically the connection is shown in FIG. 6.

As shown in this FIG. 1, a controller 200 which has buttons connected to pressure-sensitive devices inside the controller, is connected to the entertainment system 500 used for playing games or enjoying DVD video or other types of video images, and the video output terminals are connected to the television monitor 408.

Here, the analog output from the pressure-sensitive devices is converted by an A/D converter to digital values in the range 0–255 and provided to the entertainment system 500.

With reference to FIGS. 2–5, the way of the setting of the object movement velocity performed depending on the pressure-sensed value will be now described. It is assumed that the buttons used by a user for movement of images are mounted on a controller 200, with one each for the left, right, up, down, forward and backward directions, and each of these six buttons being connected to pressure-sensitive devices. In addition, regarding left, right, forward and backward, by means of the directional keys known as the so-called cruciform keys to be described later, for example, it is possible to push the forward button and left button simultaneously, push the left button and backward button simultaneously, push the backward button and right button simultaneously, and also push the right button and forward button simultaneously. Moreover, regarding up and down movements, individual buttons are provided separately, so by pushing the up button the object can be made to move upward or jump up, and by pushing the down button the object can be made to move downward or jump down.

Figure 2A:
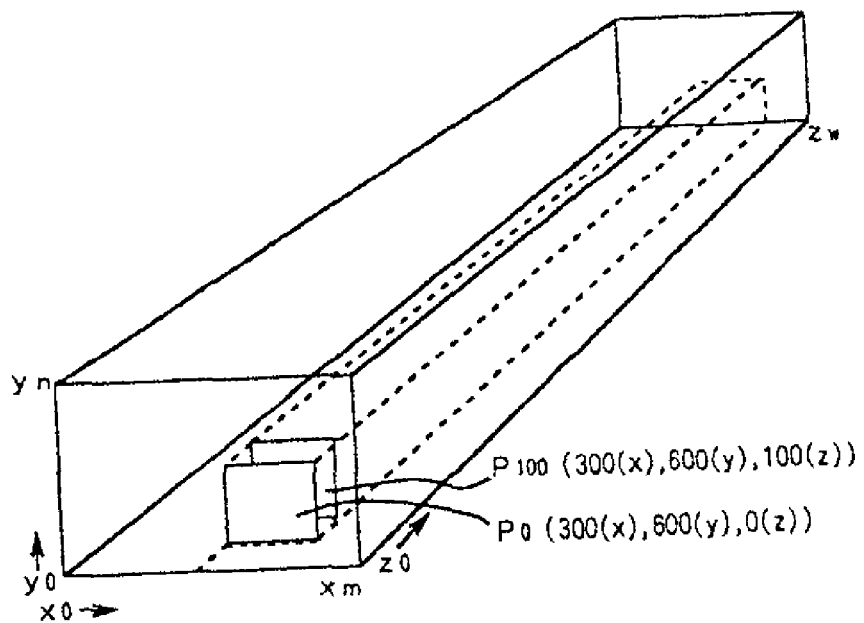
FIG. 2A shows a three-dimensional space S prepared in advance.

FIG. 2A shows a three-dimensional space S prepared in advance. This three-dimensional space S is defined entirely with x, y and z three-dimensional coordinate values, where $z_0$ is the closest to the point of view of the user and $z_w$ is the farthest away from the point of view of the user. In addition, the frame at the position $P_0$ (300(x), 600(y), 0(z)) and the frame at $P_{100}$(300(x), 600(y), 100(z)) are regions corresponding to the position of an object and these regions are displayed on the television monitor 408. These two frames illustrated as an example have the first frame being the frame closest to the point of view and the next frame being a frame displaced from the point of view by 100 in the z direction.

Figure 2B:
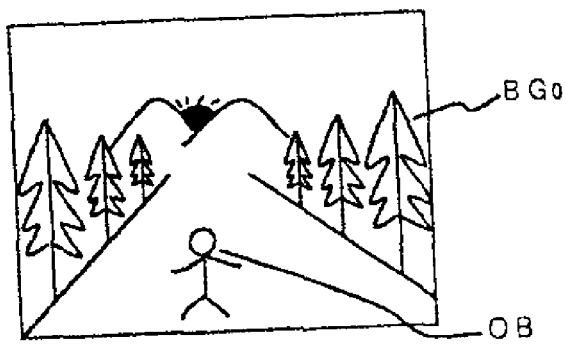
FIG. 2B shows an example of displaying the initial frame $P_0$.
Figure 2C:
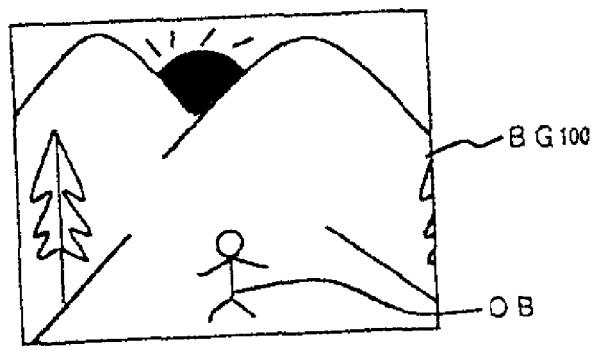
FIG. 2C shows an example of displaying the next frame $P_{100}$.
Figure 3A:
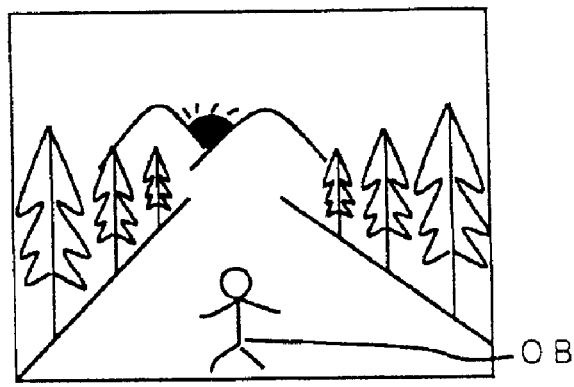
FIGS. 3A–3D show a screen with an image when the object OB is moved in the upward direction, namely when it jumps.
Figure 3B:
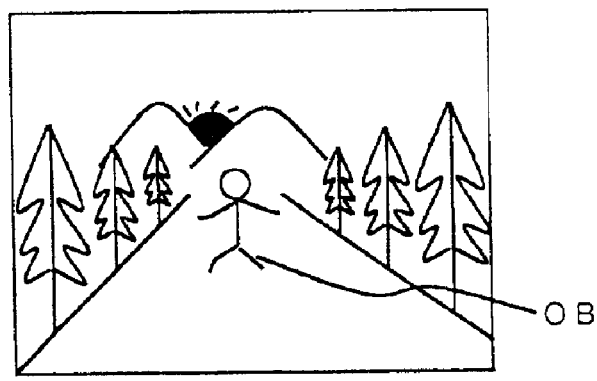
Figure 3C:
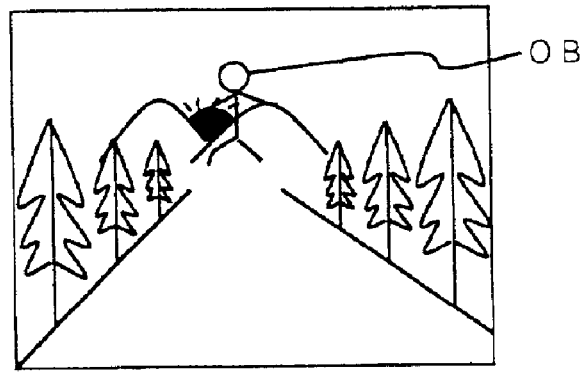
Figure 3D:
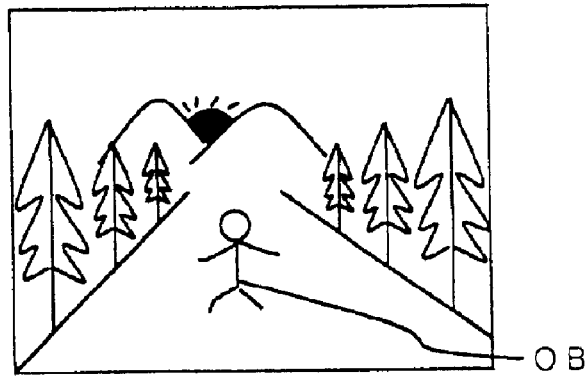

An example of displaying the first frame $P_0$ is shown in FIG. 2B, while an example of displaying the next frame $P_{100}$ is shown in FIG. 2C. As is evident from comparing these display examples 2B and C, one can see that the latter frame appears to be closer to the mountains and sun defined to be farthest back in FIG. 2A, by the amount of the z value. This can be readily discerned by comparing the relationship between the object OB and the background $BG_0$ appearing in the first frame $P_0$ against that of the object OB and the background $BG_{100}$ appearing in the next frame $P_{100}$.

FIG. 3 shows an example of an image when the object OB is made to move upward or jump up. Starting from the state wherein the object OB is as in FIG. 3A, a jump is started as in FIG. 3B, and as shown in FIG. 3C, after reaching the apex (highest point) which depends on the strength of the jump, or namely depending on the velocity which depends on the value of the pressure-sense value from the controller, the object falls as shown in FIG. 3D and lands.

In this manner, the coordinates of the destination (highest point) of movement of an object OB are found by taking a velocity coefficient E which depends on the values of various pressure-sense values output due to the pushing of the buttons allocated to left, right, up, down, forward and backward and multiplying by the current position. The coordinates of the current position $P_n$(x, y, z) of the object OB are each multiplied by the velocity coefficient E to find the next position $P_{n+1}$(xE, yE, zE). Then, the image corresponding to these coordinate values is rendered and displayed. In this manner, the greater the pressure-sense value, the object OB is moved farther and thus moves quicker, and conversely, the lesser the pressure-sense value, the object OB is not moved as far and thus moves less rapidly.

Naturally, the velocity coefficient may also be applied to x, y and z. In addition, the various coefficients E which depend on the pressure-sense value are all stored during the period of the jump until the apex is reached. After the apex is reached, the stored coefficients are reversed and change the position of the object gradually. Thereby, even if the user releases the button after the jump, the fall will still be smooth.

FIG. 4A shows a table wherein velocity coefficients E1–E255 are defined depending on pressure-sense values in the case of moving an object. The velocity coefficient is 1 when the pressure-sense value is in the range 0–5, so there is no movement of the object in this case and thus the same image is displayed. The velocity coefficients E1–E255 are each allocated to pressure-sense values 6–255, respectively.

FIG. 4B shows a table wherein velocity coefficients F1–F255 are defined depending on pressure-sense values in the case of causing an object to jump. The velocity coefficient is 1 when the pressure-sensed value is in the range 0–5, so there is no movement of the object in this case and thus the same image is displayed. The velocity coefficients F1–F255 are each allocated to pressure-sensed values 6–255, respectively.

Figure 5:
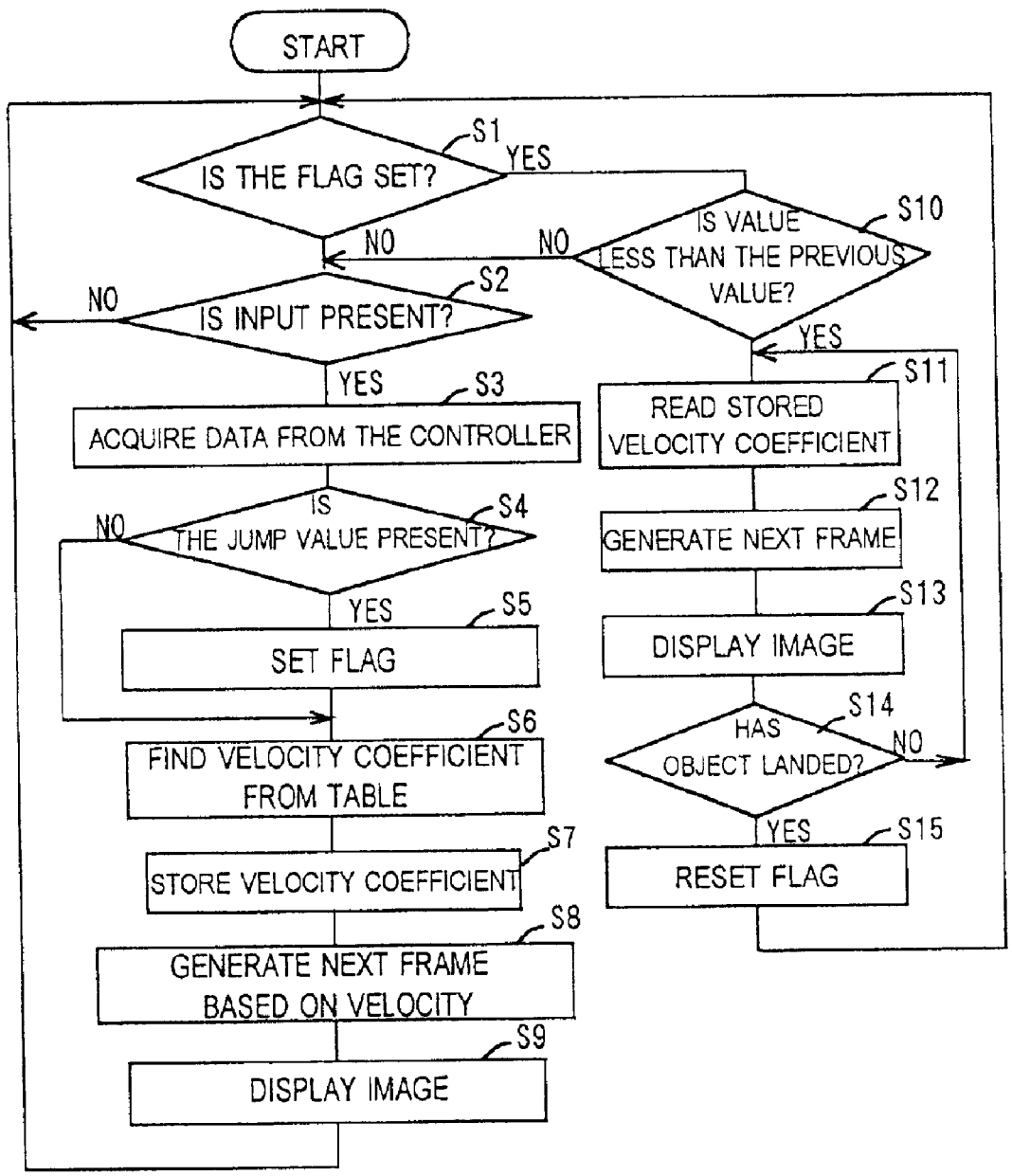
FIG. 5 is a flowchart of a program for performing a motion processing.

Next, with reference to FIG. 5, the movement process for an object will be described. FIG. 5 is a flowchart for a program for performing the objects image movement process. This program may be supplied either recorded alone upon an optical disc or other recording medium, or recorded upon said recording medium together with the game software as part of the game software. This program is run by the entertainment system 500 and executed by its CPU.

The meaning of supplying these programs recorded individually on a recording medium has the meaning of preparing them in advance as a library for software development.

As is common knowledge, at the time of developing software, writing all functions requires an enormous amount of time. However, if the software functions are divided into single functions, for example, for moving objects and the like, they can be used commonly by various types of software, so more functions can be included.

To this end, a function such as that described in this preferred embodiment that can be used commonly may be provided to the software manufacturer side as a library program. When general functions like this are supplied as external programs in this manner, it is sufficient for the software manufacturers to write only the essential portions of the software.

In Step S1, a decision is made as to whether or not a jump flag used to indicate a jump is set, and if "YES" then control moves to Step S9, but if "NO" then control moves to Step S2.

In Step S2, a decision is made as to whether or not input is present, and if "YES" then control moves to Step S3 where a pressure-sense value is acquired from the controller 200.

Next, moving to Step S4, a decision is made as to whether or not a value corresponding to a jump is present, and if "YES" then control moves to Step S5 where the jump flag is set, but if "NO" then control moves to Step S6 and the velocity coefficients E each depending on the various pressure-sense values for left, right, forward and backward are found based on the table shown in FIG. 4A.

Next, in Step S7, the velocity coefficients found in Step S6 are stored. Next, in Step S8, each of the coordinates of the current position $P_n(x, y, z)$ are multiplied sequentially by the velocity coefficients E for left, right, forward and backward to find the coordinate values for the next position. Note that x is multiplied by the left/right velocity coefficient E, y is multiplied by the up/down velocity coefficient E, and z is multiplied by the forward/backward velocity coefficient E.

Then, the individual apex coordinate values for the object are corrected based on the coordinate values of the next frame, and based on light-source calculations, the intensity of pixels at the apex indicated by various coordinate values are set, and next the apex coordinate values of the object are subjected to perspective transformation and transformed into two-dimensional coordinate values, texture data is mapped to the region indicated by these two-dimensional coordinate values, and the rendering process is performed to generate one frame of the image.

In Step S9, the aforementioned one frame of the image is displayed on the television monitor 408.

It is to be noted that in the movement of an object upon a two-dimensional plane, x and y are multiplied by velocity coefficients E found from pressure-sense values corresponding to the up and right directional keys, left and down directional keys, down and right directional keys, or right and up directional keys, respectively.

In Step S10, a decision is made as to whether or not the value which is current, is less than the previous value and if the response is "YES" then the control procedure moves to Step S11, but if "NO" then the control procedure moves back to Step S2. This Step S10 is where a decision is made as to whether the apex of the jump has been reached, namely whether or not to go to the falling process after the apex is reached.

In Step S11, the falling calculations are performed depending on the velocity coefficients during falling. In the same manner as the multiplication already described, these are performed by multiplying the y coordinate value of the current position $P_n(x, y, z)$ by the velocity coefficient. It should be noted that in the case wherein the jump angle is not a vertical 90°, then it is sufficient to find various coefficients for x, for y and for z from the jump to the landing place depending on the angle, and multiply the current position $P_n(x, y, z)$ by these coefficients.

In Step S12, one frame of the image is generated, and in Step S13 it is displayed on the television monitor 408.

In Step S14, a decision as to whether or not the object has landed is made based on the coordinate values thus found, and if "YES" then the flag is reset in Step S15 and control procedure moves back to Step S1, but if "NO" then the control procedure moves to Step S11.

It is to be noted that it is also possible to find the percent change from the previous pressure-sense value to the current pressure-sense value, and find the next position by means of a velocity coefficient that depends on this percent change. For example, if the previous pressure-sensed value is 100 and the current pressure-sensed value is 50, then the percent change is 50%, so the velocity coefficient used may be a velocity coefficient ½ the maximum velocity coefficient if initial or if not initial, a velocity coefficient ½ the velocity coefficient used immediately before may be used. By doing so, it is possible to make the character move smoothly or perform jumps or other actions depending on the strength with which the user pushes the button.

FIG. 6 is a diagram showing the controller 200 connected to entertainment system 500. The controller 200 is removably connected to the entertainment system 500, and the entertainment system 500 is connected to television monitor 408.

The entertainment system 500 reads the program for a computer game from recording media upon which that program is recorded and by executing the program, displays characters on the television monitor 408. The entertainment system 500 has also various built-in functions for DVD (Digital Versatile Disc) playback, CDDA (compact disc digital audio) playback and the like. The signals from the controller 200 are also processed as one of the aforementioned control functions within the entertainment system 500, and the content thereof may be reflected in the movement of characters and the like, on the television monitor 408.

While this depends also on the content of the computer game program, controller 200 may be allocated functions for moving the characters display on the television monitor 408 in the directions up, down, left or right.

Figure 7:
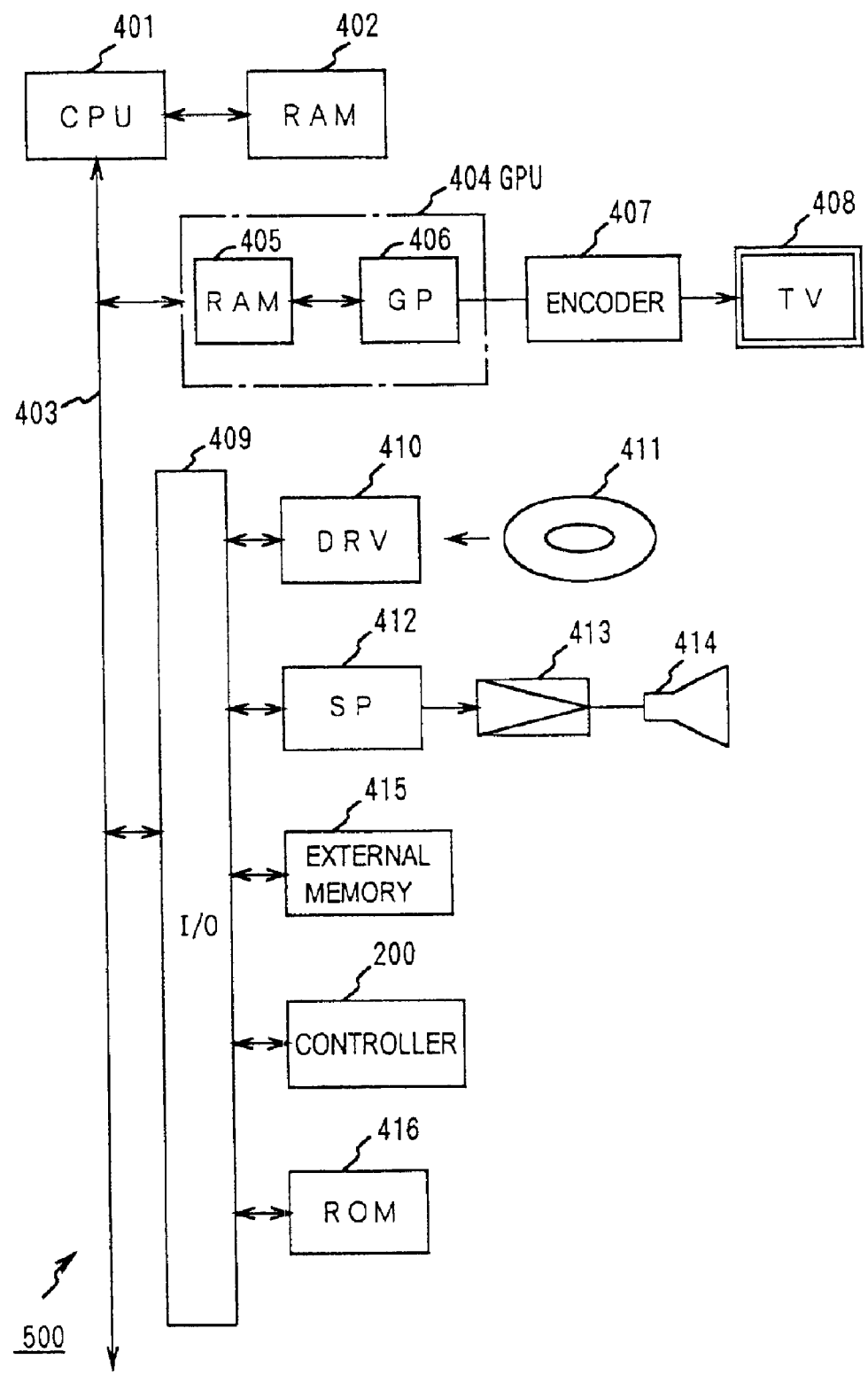
FIG. 7 is a block diagram of the entertainment system.

With reference to FIG. 7, here follows a description of the interior of the entertainment system 500 shown in FIG. 6. FIG. 7 is a block diagram of the entertainment system 500.

A CPU 401 is connected to RAM 402 and a bus 403, respectively. Connected to bus 403 are a graphics processor unit (GPU) 404 and an input/output processor (I/O) 409, respectively. The GPU 404 is connected via an encoder 407 for converting a digital RGB signal or the like into the NTSC standard television format, for example, to a television monitor (TV) 408 as a peripheral. Connected to the I/O 409 are a driver (DRV) 410 used for the playback and decoding of data recorded upon an optical disc 411, a sound processor (SP) 412, an external memory 415 consisting of flash memory, controller 200 and a ROM 416 which records the operating system and the like. The SP 412 is connected via an amplifier 413 to a speaker 414 as a peripheral.

Here, the external memory 415 may be a card-type memory consisting of a CPU or a gate array and flash memory, which is removably connected via a connector 511 to the entertainment system 500 shown in FIG. 6.

The controller 200 is configured such that, when a plurality of buttons provided thereupon are pushed, it gives instructions to the entertainment system 500. In addition, the driver 410 is provided with a decoder for decoding images encoded based upon the MPEG standard.

The description will be made now as to how the images will be displayed on the television monitor 408 based on the operation of controller 200. It is assumed that data for objects consisting of polygon vertex data, texture data and the like recorded on the optical disc 411 is read by the driver 410 and stored in the RAM 402 of the CPU 401.

When instructions from the player via controller 200 are provided as an input to the entertainment system 500, the CPU 401 calculates the three-dimensional position and orientation of objects with respect to the point of view based on these instructions. Thereby, the polygon vertex data for objects defined by X, Y, Z coordinate values are modified variously. The modified polygon vertex data is subjected to perspective conversion processing and converted into two-dimensional coordinate data.

The regions specified by two-dimensional coordinates are so-called polygons. The converted coordinate data, Z data and texture data are supplied to the GPU 404. Based on this converted coordinate data, Z data and texture data, the GPU 404 performs the drawing process by writing texture data sequentially into the Ram 405. One frame of image data upon which the drawing process is completed, is encoded by the encoder 407 and then supplied to the television monitor 408 and displayed on its screen as an image.

Figure 8:
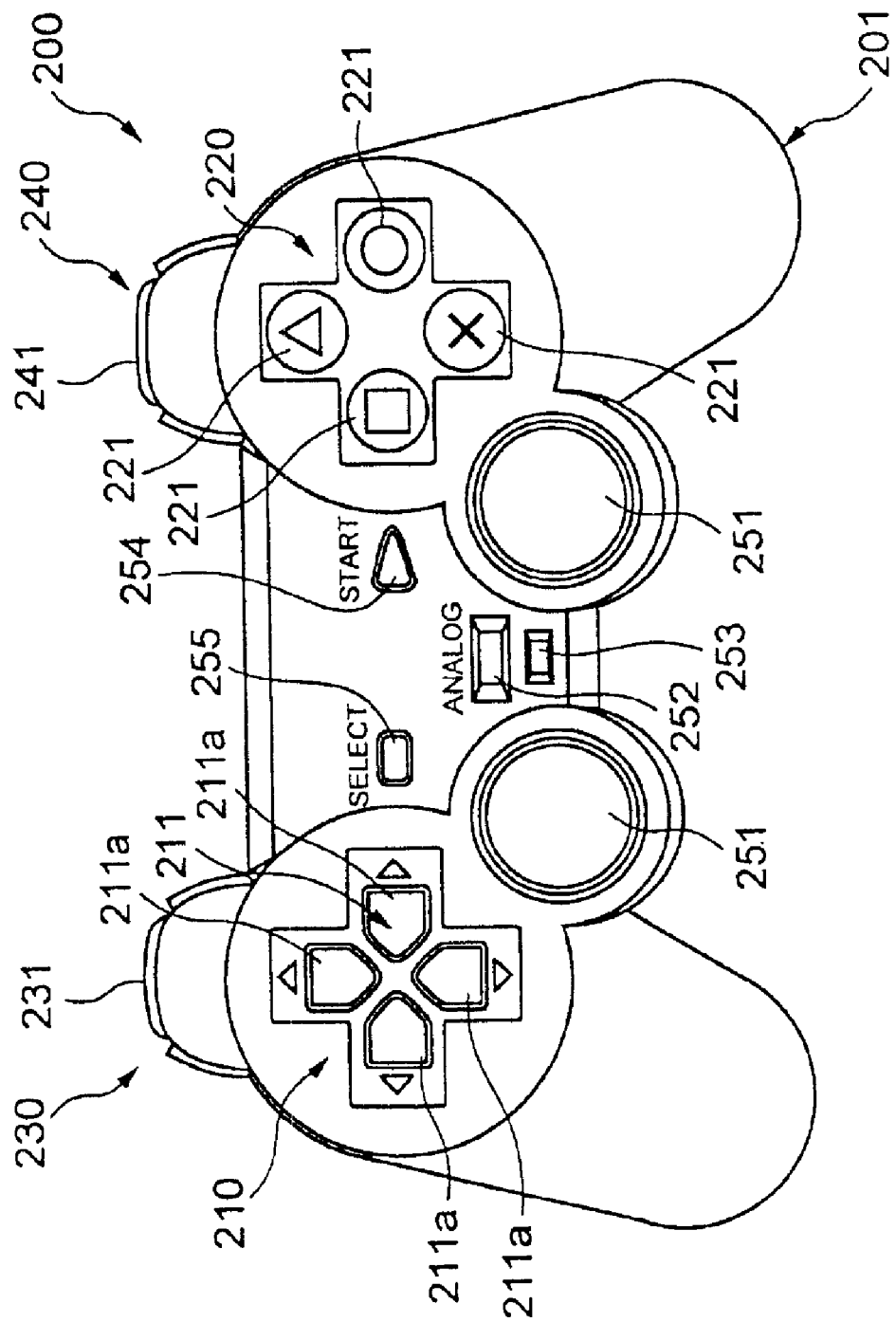
FIG. 8 is a top view of the controller.

FIG. 8 is a top view of controller 200. The controller 200 consists of a unit body 201 on the top surface of which are provided first and second control parts 210 and 220, and on the side surface of which are provided third and fourth control parts 230 and 240 of the controller 200.

The first control part 210 of the controller is provided with a cruciform control unit 211 used for pushing control, and the individual control keys 211a extending in each of the four directions of the control unit 211 form a control element. The first control part 210 is the control part for providing movement to the characters displayed on the screen of the television receiver, and has the functions for moving the characters in the up, down, left and right directions by pressing the individual control keys 211a of the cruciform control unit 211.

The second control part 220 is provided with four cylindrical control buttons 221 (control elements) for pushing control. The individual control buttons 221 have identifying marks such as "○" (circle), "×" (cross), "Δ" (triangle), and "□" (quadrangle) on their tops, in order to easily identify the individual control buttons 221. The functions of the second control part 220 are set by the game program recorded on the optical disc 411, and the individual control buttons 221 may be allocated functions that change the state of the game characters, for example. For example, the control buttons 221 may be allocated the functions for moving the left arm, right arm, left leg and right leg of the character.

The third and fourth control parts 230 and 240 of the controller have nearly the same structure, and both are provided with two control buttons 231 and 241 (control elements) for pushing control, arranged above and below. The functions of these third and fourth control parts 230 and 240 are also set by the game program recorded upon the optical disc, and may be allocated functions for making the game characters do special actions, for example.

Moreover, two joy sticks 251 for performing analog operation are provided upon the unit body 201 shown in FIG. 8. The joy sticks 251 can be switched and used instead of the first and second control parts 210 and 220 described above. This switching is performed by means of an analog selection switch 252 provided upon the unit body 201. When the joy sticks 251 are selected, a display lamp 253 provided on the unit body 201 lights, indicating the state wherein the joy sticks 251 are selected.

It is to be noted that on unit body 201 there are also provided a start switch 254 for starting the game and a select switch 255 for selecting the degree of difficulty or the like at the start of a game, and the like. In FIG. 8, the controller 200 is held by the left hand and the right hand and is operated by the other fingers, and in particular the thumbs are able to operate most of the buttons on the top surface.

FIG. 9 and FIGS. 10A–10C are respectively an exploded perspective view and cross-sectional views showing the second control part of the controller.

Figure 9:
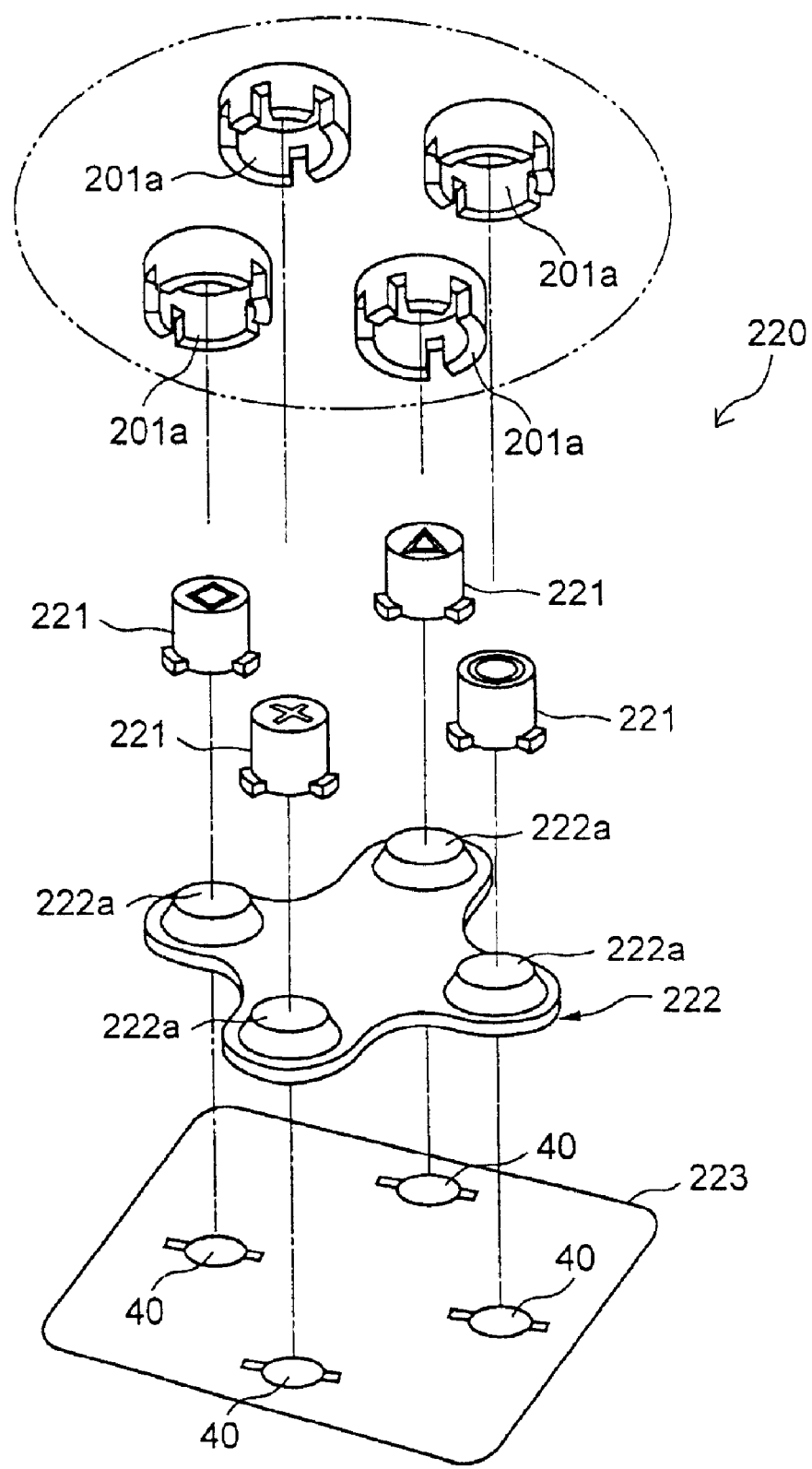
FIG. 9 is an exploded perspective view of an embodiment of a second control part of the controller.

As shown in FIG. 9, the second control part 220 consists of four control buttons 221 which serve as the control elements, an elastic body 222, and a sheet member 223 provided with resistors 40. The individual control buttons 221 are inserted from behind through insertion holes 201a formed on the upper surface of the unit body 201. The control buttons 221 inserted into the insertion holes 201a are able to move freely in the axial direction.

Figure 10A:
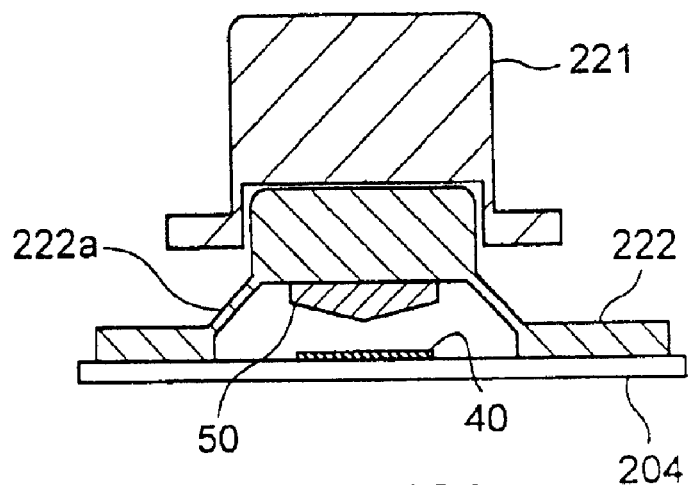
FIGS. 10A–10C are cross sections of the embodiment of the second control part of FIG. 9.
Figure 10B:
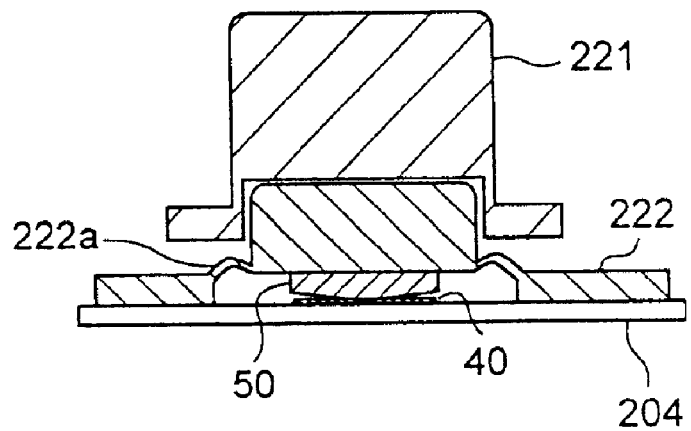
Figure 10C:
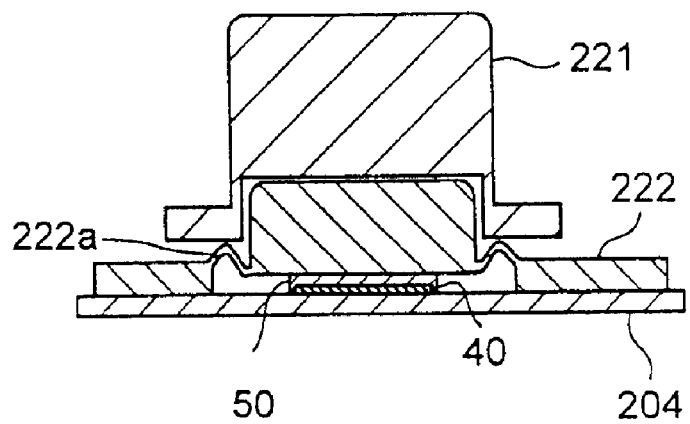

The elastic body 222 is made of insulating rubber or the like and has elastic areas 222a which protrude upward, and the lower ends of the control buttons 221 are supported upon the upper walls of the elastic areas 222a. When the control buttons 221 are pressed, the inclined-surface portions of these elastic areas 222a flex so that the upper walls move together with the control buttons 221. On the other hand, when the pushing pressure on the control buttons 221 is released, the flexed inclined-surface portions of elastic areas 222a elastically return to their original shape, pushing up the control buttons 221. The elastic body 222 functions as a spring means whereby control buttons 221 which had been pushed in by a pushing action are returned to their original positions. As shown in FIGS. 10A–10C, conducting members 50 are attached to the rear surface of the elastic body 222.

The sheet member 223 consists of a membrane or other thin sheet material which has flexibility and insulating properties. Resistors 40 are provided in appropriate locations on this sheet member 223 and these resistors 40 and conducting member 50 are each disposed such that they face one of the control buttons 221 via the elastic body 222. The resistors 40 and conducting members 50 form pressure-sensitive devices. These pressure-sensitive devices consisting of resistors 40 and conducting members 50 have resistance values that vary depending on the pushing pressure received form the control buttons 221.

To describe this in more detail, as shown in FIGS. 10A–10C, the second control part 220 is provided with control buttons 221 as control elements, an elastic body 222, conducting members 50 and resistors 40. Each conducting member 50 may be made of conductive rubber which has elasticity, for example, and has a conical shape with its center as a vertex. The conducting members 50 are adhered to the inside of the top surface of the elastic areas 222a formed in the elastic body 222.

In addition, the resistors 40 may be provided on an internal board 204, for example, opposite the conducting members 50, so that the conducting members 50 come into contact with resistors 40 together with the pushing action of the control buttons 221. The conducting member 50 deforms, depending on the pushing force on the control button 221 (namely the contact pressure with the resistor 40), so as shown in FIGS. 10B and 10C, the surface area in contact with the resistor 40 varies depending on the pressure. To wit, when the pressing force on the control button 221 is weak, as shown in FIG. 10B, only the area near the conical tip of the conducting member 50 is in contact. As the pressing force on the control button 221 becomes stronger, the tip of the conducting member 50 deforms gradually so the surface area in contact expands.

Figure 11:
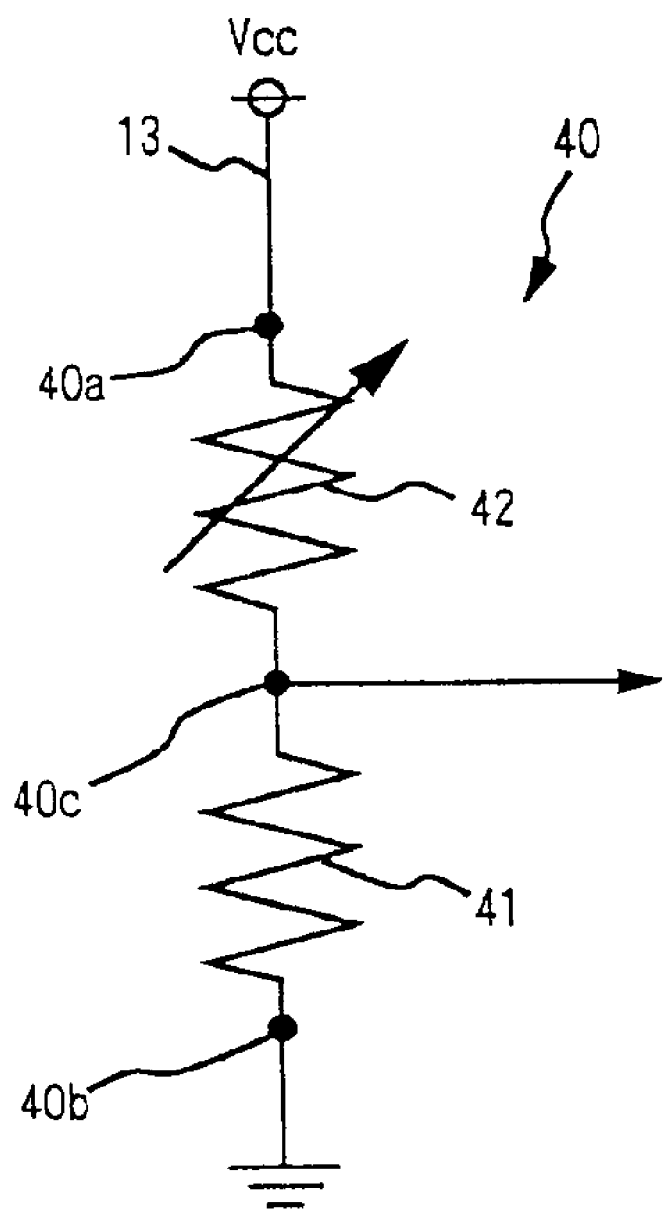
FIG. 11 is a diagram showing an equivalent circuit for a pressure-sensitive device.

FIG. 11 is a diagram showing an equivalent circuit for a pressure-sensitive device consisting of a resistor 40 and conducting member 50. As shown in this diagram, the pressure-sensitive device is inserted in series in a power supply line 13, where the voltage $V_{cc}$ is applied between the electrodes 40a and 40b. As shown in this diagram, the pressure-sensitive device is divided into a variable resistor 42 that has the relatively small resistance value of the conducting member 50, and a fixed resistor 41 that has the relatively large resistance value of the resistor 40. Among these, the portion of the variable resistor 42 is equivalent to the portion of resistance in the contact between the resistor 40 and the conducting member 50, so the resistance value of the pressure-sensitive device varies depending on the surface area of contact with the conducting member 50.

When the conducting member 50 comes into contact with the resistor 40, in the portion of contact, the conducting member 50 becomes a bridge instead of the resistor 40 and a current flows, so the resistance value becomes smaller in the portion of contact. Therefore, the greater the surface area of contact between the resistor 40 and conducting member 50, the lower the resistance value of the pressure-sensitive device becomes. In this manner, the entire pressure-sensitive device can be understood to be a variable resistor. It is noted that FIGS. 10A–10C show only the contact portion between the conducting member 50 and resistor 40 which forms the variable resistor 42 of FIG. 11, but the fixed resistor of FIG. 13 is omitted form FIG. 12.

In the preferred embodiment, an output terminal is provided near the boundary between the variable resistor 42 and fixed resistor 41, namely near the intermediate point of the resistors 40, and thus a voltage stepped down from the applied voltage $V_{cc}$ by the amount the variable resistance is extracted as an analog signal corresponding to the pushing pressure by the user on the control button 221.

First, since a voltage is applied to the resistor 40 when the power is turned on, even if the control button 221 is not pressed, a fixed analog signal (voltage) $V_{min}$ is provided as the output from the output terminal 40c. Next, even if the control button 221 is pressed, the resistance value of this resistor 40 does not change until the conducting member 50 contacts the resistor 40, so the output from the resistor 40 remains unchanged at $V_{min}$.

If the control button 221 is pushed further and the conducting member 50 comes into contact with the resistor 40, the surface area of contact between the conducting member 50 and the resistor 40 increases in response to the pushing pressure on the control button 221, and thus the resistance of the resistor 40 is reduced so the analog signal (voltage) output from the output terminal 40c of the resistor 40 increases. Furthermore, the analog signal (voltage) output form the output terminal 40c of the resistor 40 reaches the maximum $V_{max}$ when the conducting member 50 is most deformed.

Figure 12:
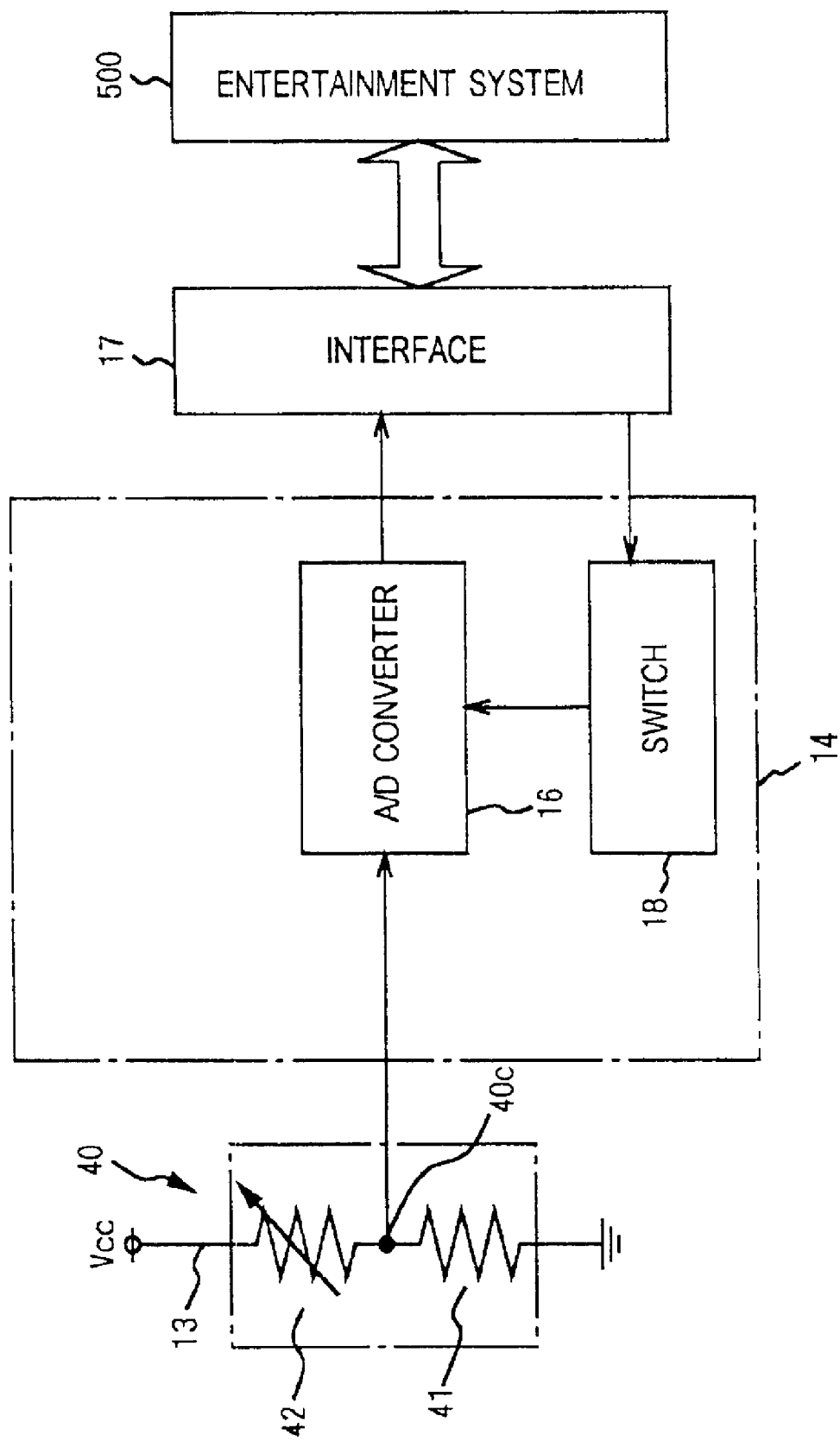
FIG. 12 is a block diagram of the main parts of the controller.
Figure 13:
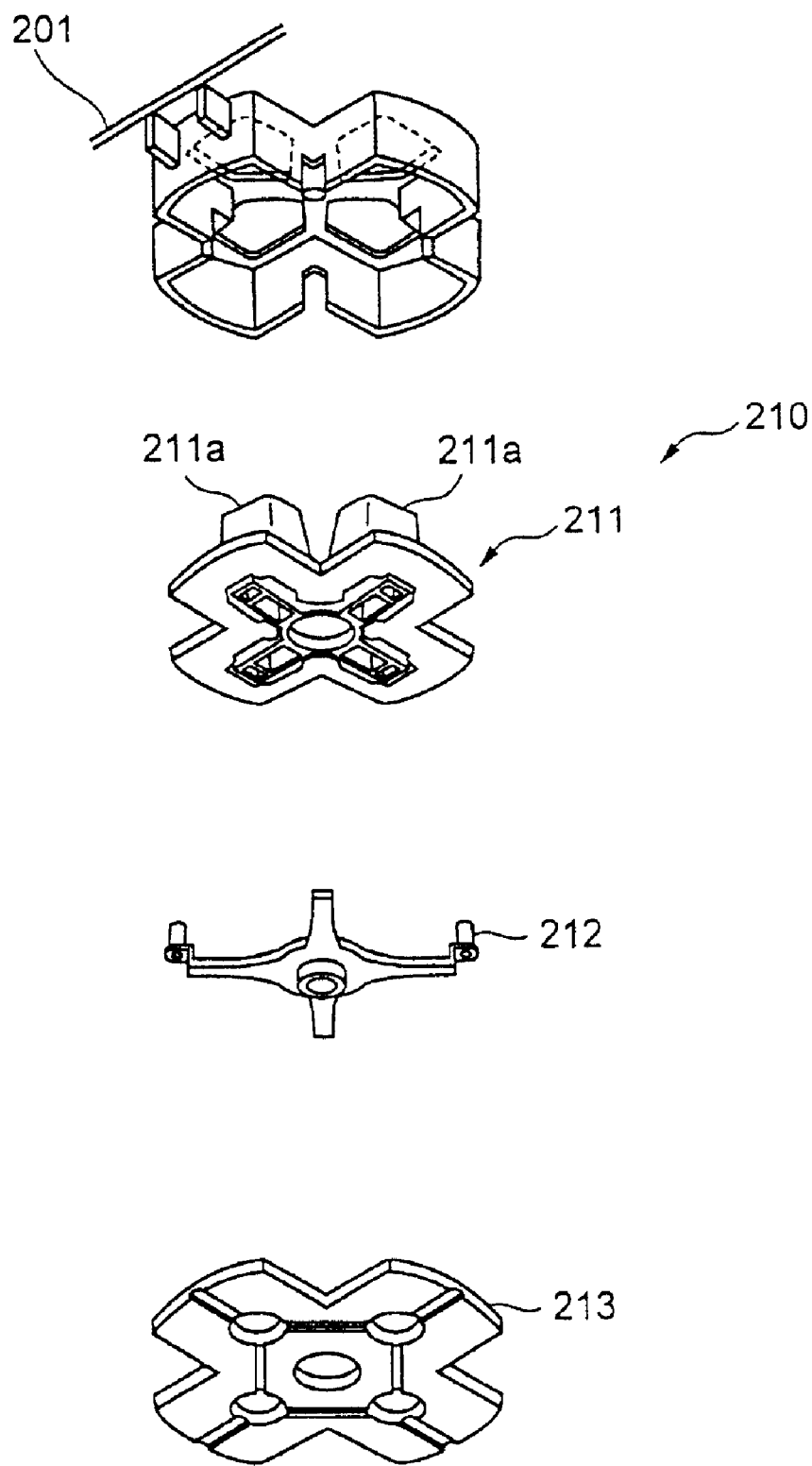
FIG. 13 is an exploded perspective view of a first control part of the controller.

FIG. 12 is a block diagram showing the main parts of the controller 200.

An MPU 14 mounted on the internal board of the controller 200 is provided with a switch 18, an A/D converter 16 and two vibration generation systems. The analog signal (voltage) output from the output terminal 40c of the resistor 40 is provided as the input to the A/D converter 16 and is converted to a digital signal.

The digital signal output from the A/D converter 16 is sent via an interface 17 provided upon the internal board of the controller 200 to the entertainment system 500 and the actions of game characters and the like are executed based on this digital signal.

Changes in the level of the analog signal output from the output terminal 40c of the resistor 40 correspond to changes in the pushing pressure received form the control button 221 (control element) as described above. Therefore, the digital signal outputted from the A/D converter 16 corresponds to the pushing pressure on the control button 221 (control element) from the user. If the actions of the game characters and the like are controlled based on the digital signal that has such a relationship with the pushing pressure from the user, it is possible to achieve smoother and more analog-like action than with control based on a binary digital signal based only on zeroes and ones.

The configuration is such that the switch 18 is controlled by a control signal sent from the entertainment system 500 based on a game program recorded on an optical disc 411. When a game program recorded on optical disc is executed by the entertainment system 500, depending on the content of the game program, a control signal is provided as output to specify whether the A/D converter 16 is to function as a means of providing output of a multi-valued analog signal, or as a means of providing a binary digital signal. Based on this control signal, the switch 18 is switched to select the function of the A/D converter 16.

Figure 14:
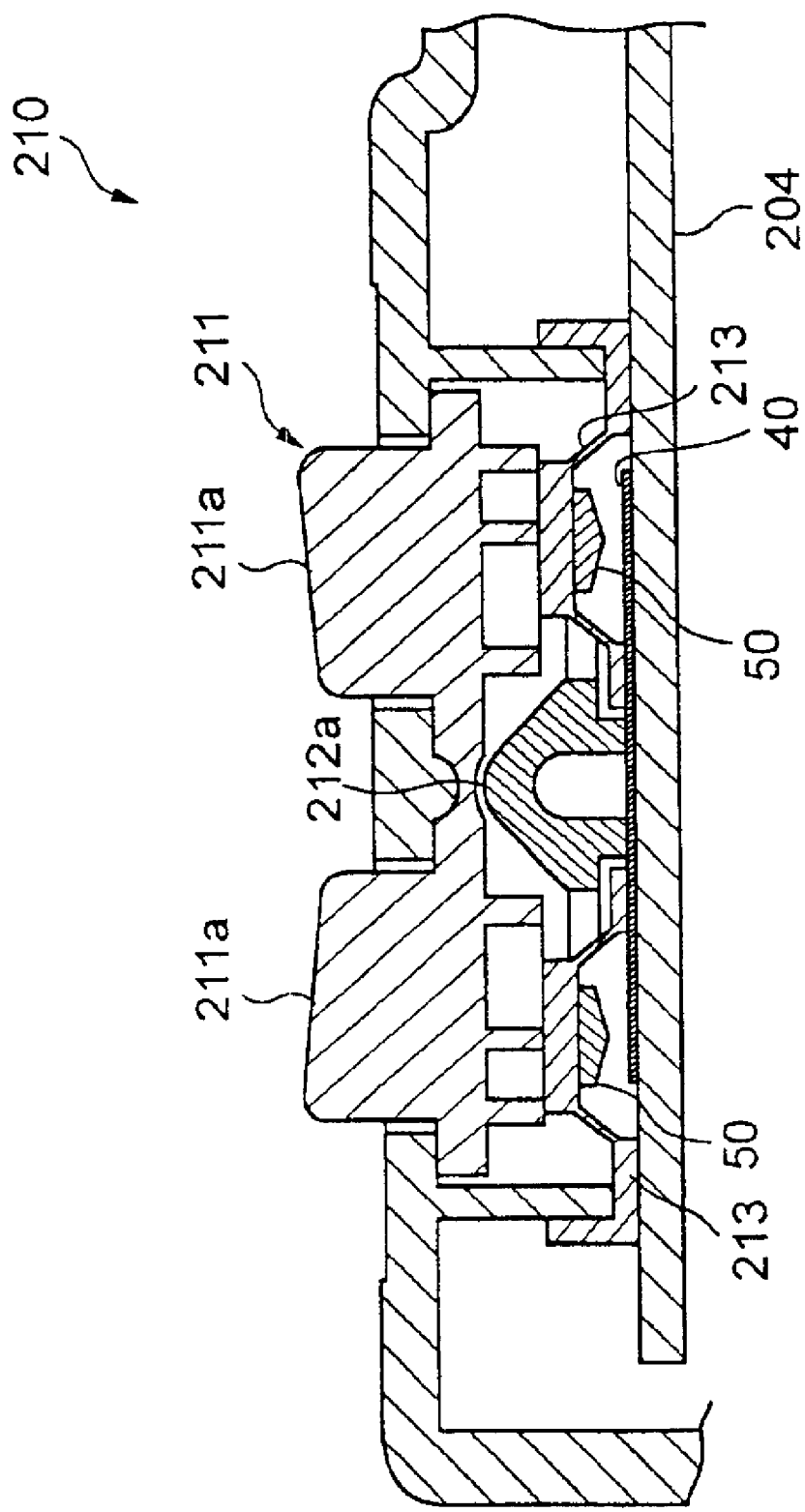
FIG. 14 is a cross-sectional view of the first control part of the controller of FIG. 13.

FIGS. 13 and 14 show an embodiment of the first control part of the controller.

As shown in FIG. 13, the first control part 210 includes a cruciform control unit 211, a spacer 212 that positions this control unit 211, and an elastic body 213 that elastically supports the control unit 211. Moreover, as shown in FIG. 12, a conducting member 50 is attached to the rear surface of the elastic body 213, and the configuration is such that resistors 40 are disposed at the positions facing the individual control keys 211a (control elements) of the control unit 211 via the elastic body 213.

The overall structure of the first control part 210 has already been made public knowledge in the publication of unexamined Japanese patent application No. JP-A-H8-163672. The control unit 211 uses a hemispherical projection 212a formed in the center of the spacer 212 as a fulcrum, and the individual control keys 211a (control elements) are assembled such that they can push on the resistor 40 side (see FIG. 14).

Conducting members 50 are adhered to the inside of the top surface of the elastic body 213 in positions corresponding to the individual control keys 211a (control elements) of the cruciform control unit 211. In addition, the resistors 40 with a single structure are disposed such that they face the individual conducting members 50.

When the individual control keys 211a which are control elements are pushed, the pushing pressure acts via the elastic body 213 on the pressure-sensitive devices consisting of a conducting member 50 and resistor 40, so that its electrical resistance value varies depending on the magnitude of the pushing pressure.

Figure 15:
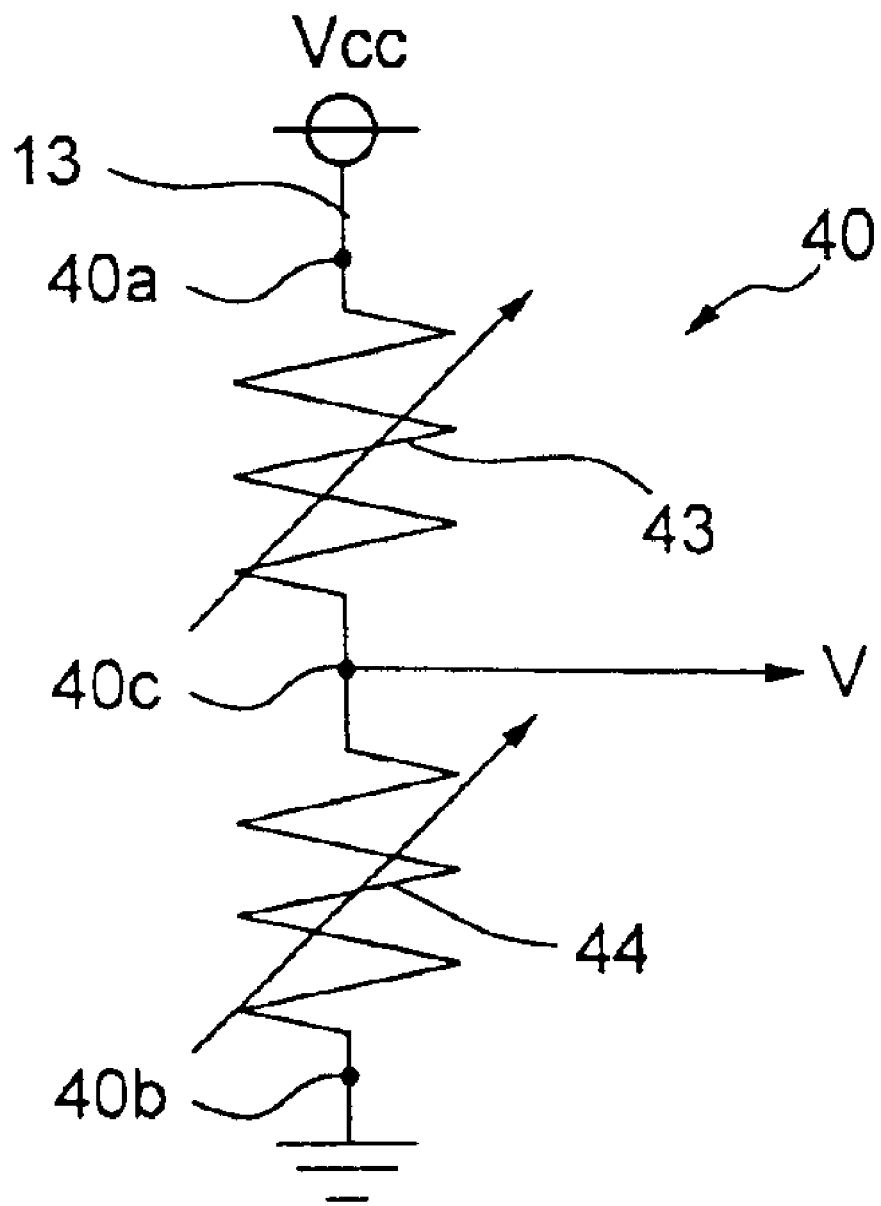
FIG. 15 is a diagram showing a circuit configuration of a resistor.

FIG. 15 is a diagram showing the circuit configuration of the resistor. As shown in this diagram, the resistor 40 is inserted in series in a power supply line 13, where a voltage is applied between the electrodes 40a and 40b. The resistance of this resistor 40 is illustrated schematically, as shown in this diagram; the resistor 40 is divided into first and second variable resistors 43 and 44.

Among these, the portion of the first variable resistor 43 is in contact, respectively, with the conducting member 50 that moves together with the control key (up directional key) 211a for moving the character in the up direction, and with the conducting member 50 that moves together with the control key (left directional key) 211a for moving the character in the left direction, so its resistance value varies depending on the surface area in contact with these conducting members 50.

In addition, the portion of the second variable resistor 44 is in contact, respectively, with the conducting member 50 that moves together with the control key (down directional key) 211a for moving the character in the down direction, and with the conducting member 50 that moves together with the control key (right directional Key) 211a for moving the character in the right direction, so its resistance value varies depending on the surface area in contact with these conducting members 50.

Moreover, an output terminal 40c is provided intermediate between the variable resistors 43 and 44, and an analog signal corresponding to the pushing pressure on the individual control keys 211a (control elements) is providing as output from this output terminal 40c.

The output from the output terminal 40c can be calculated from the ratio of the split in resistance value of the first and second variable resistors 43 and 44. For example, if R1 is the resistance value of the first variable resistor 43, R2 is the resistance value of the second variable resistor 44 and $V_{cc}$ is the power supply voltage, then the output voltage V appearing at the output terminal 40c can be expressed by the following equation.

$$V = V_{cc} \times R2/(R1+R2)$$

Therefore, when the resistance value of the first variable resistor 43 decreases, the output voltage increases, but when the resistance value of the second variable resistor 44 decreases, the output voltage also decreases.

Figure 16:
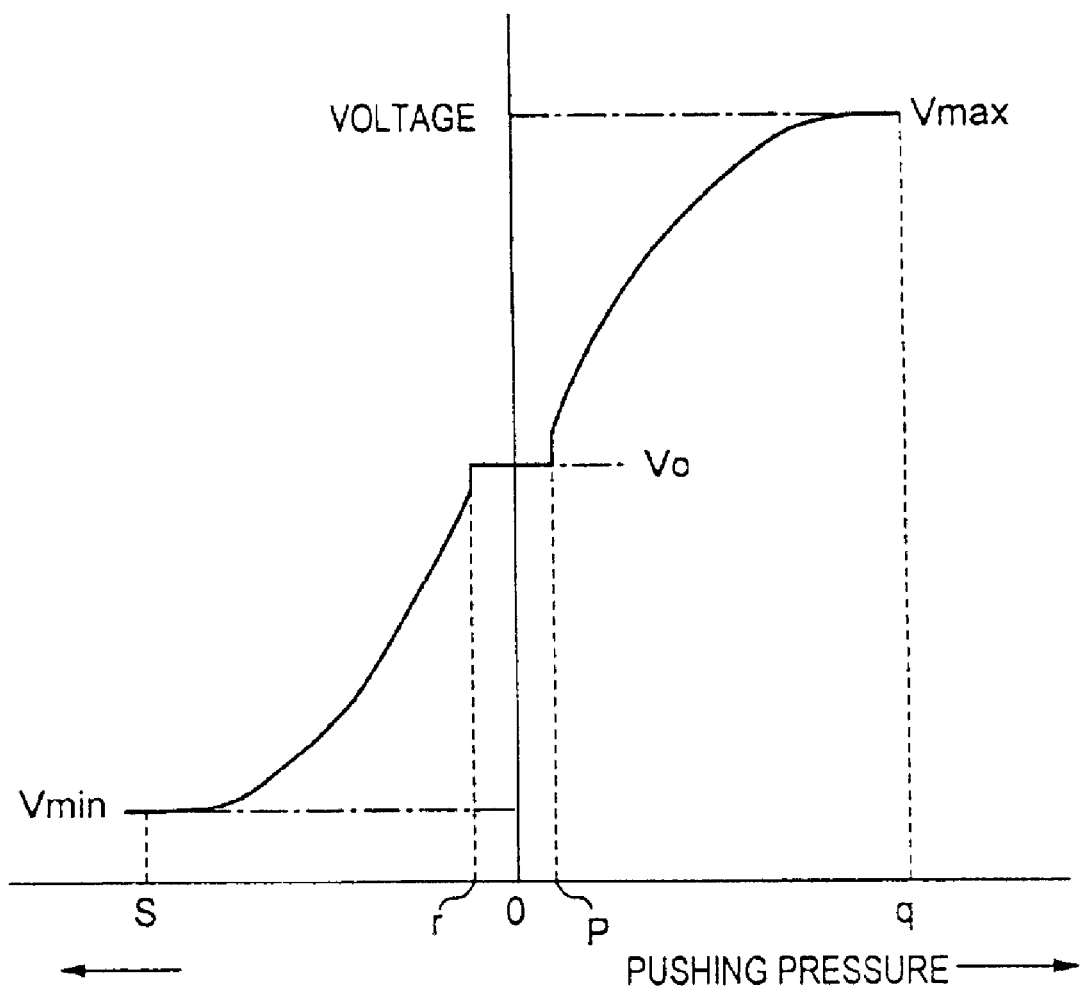
FIG. 16 is a graph showing the characteristic of the signal output.

FIG. 16 is a graph showing the characteristic of the analog signal (voltage) outputted from the output terminal of the resistor.

First, since a voltage is applied to the resistor 40 when the power is turned on, even if the individual control keys 211a of the control unit 211 are not pressed, a fixed analog signal (voltage) $V_0$ is provided as output form the output terminal 40c (at position 0 in the graph).

Next, even if one of the individual control keys 221a is pressed, the resistance value of this resistor 40 does not change until the conducting member 50 contacts the resistor 40, and the output from the resistor 40 remains unchanged at $V_0$.

Furthermore, if the up-directional key or left-directional key is pushed until the conducting member 50 comes into contact with the first variable resistor 43 portion of the resistor 40 (at position p in the graph), thereafter the surfaced area of contact between the conducting member 50 and the first variable resistor 43 portion increases in response to the pushing pressure on the control key 221a (control element), and thus the resistance of that portion is reduced so the analog signal (voltage) output from the output terminal 40c of the resistor 40 increases. Furthermore, the analog signal (voltage) output form the output terminal 40c of the resistor 40 reaches the maximum $V_{max}$ when the conducting member 50 is most deformed (at position s in the graph).

On the other hand, if the down-directional key or right-directional key is pushed until the conducting member 50 comes into contact with the second variable resistor 44 portion of the resistor 40 (at position r in the graph), thereafter the surface area of contact between the conducting member 50 and the second variable resistor 44 portion increases in response to the pushing pressure on the control key 211a (control element), and thus the resistance of that portion is reduced, and as a result, the analog signal (voltage) output from the output terminal 40c of the resistor 40 decreases. Furthermore, the analog signal (voltage) output form the output terminal 40c of the resistor 40 reaches the minimum $V_{min}$ when the conducting member 50 is most deformed (at position q in the graph).

Figure 17:
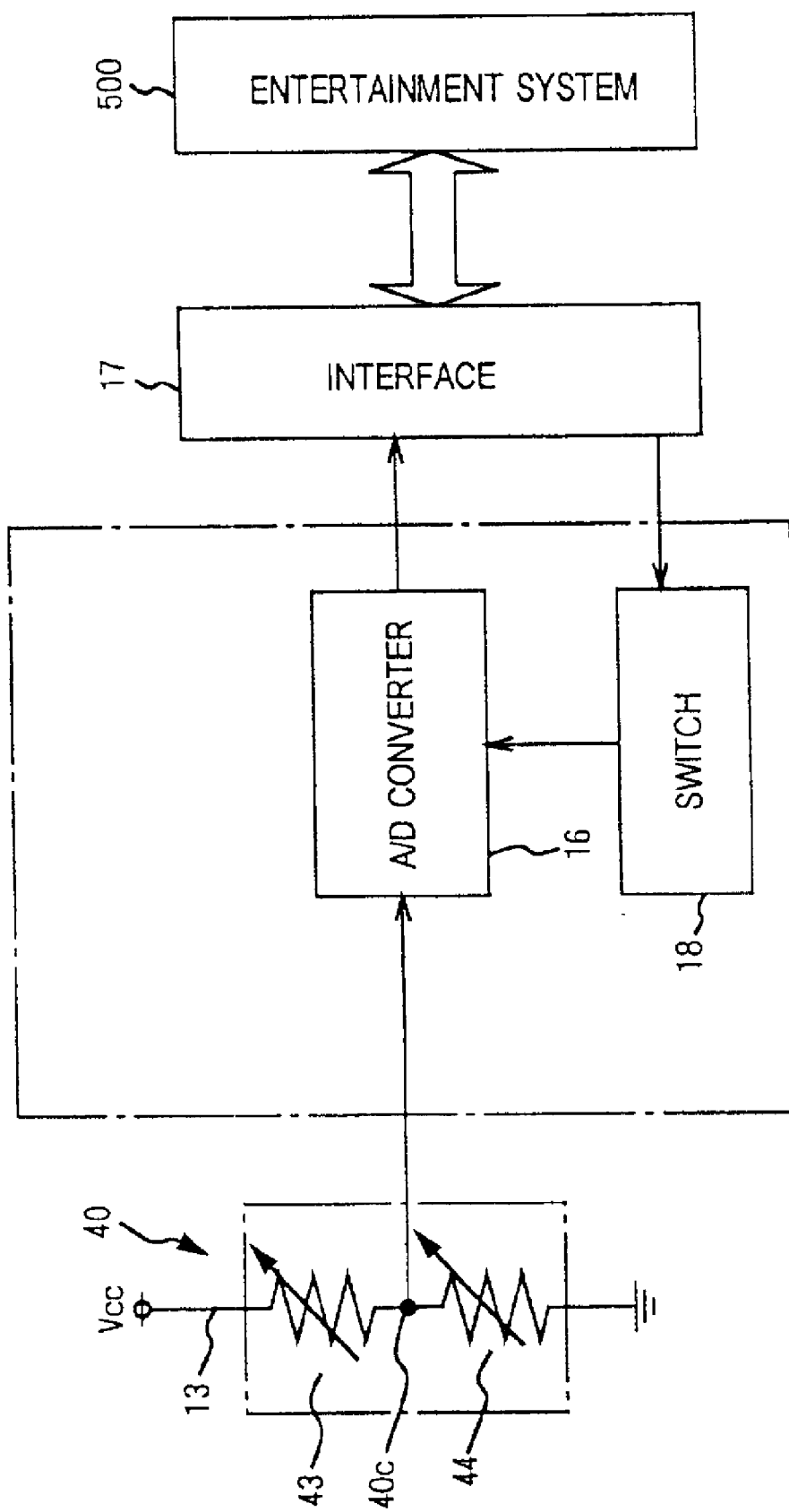
FIG. 17 is a block diagram of the overall constitution including the resistor.

As shown in FIG. 17, the analog signal (voltage) output from the output terminal 40c of the resistor 40 is provided as input to an A/D converter 16 and converted to a digital signal. Note that the function of the A/D converter 16 is shown in FIG. 17 is as described previously based on FIG. 12, so a detailed description shall be omitted here.

Figure 18:
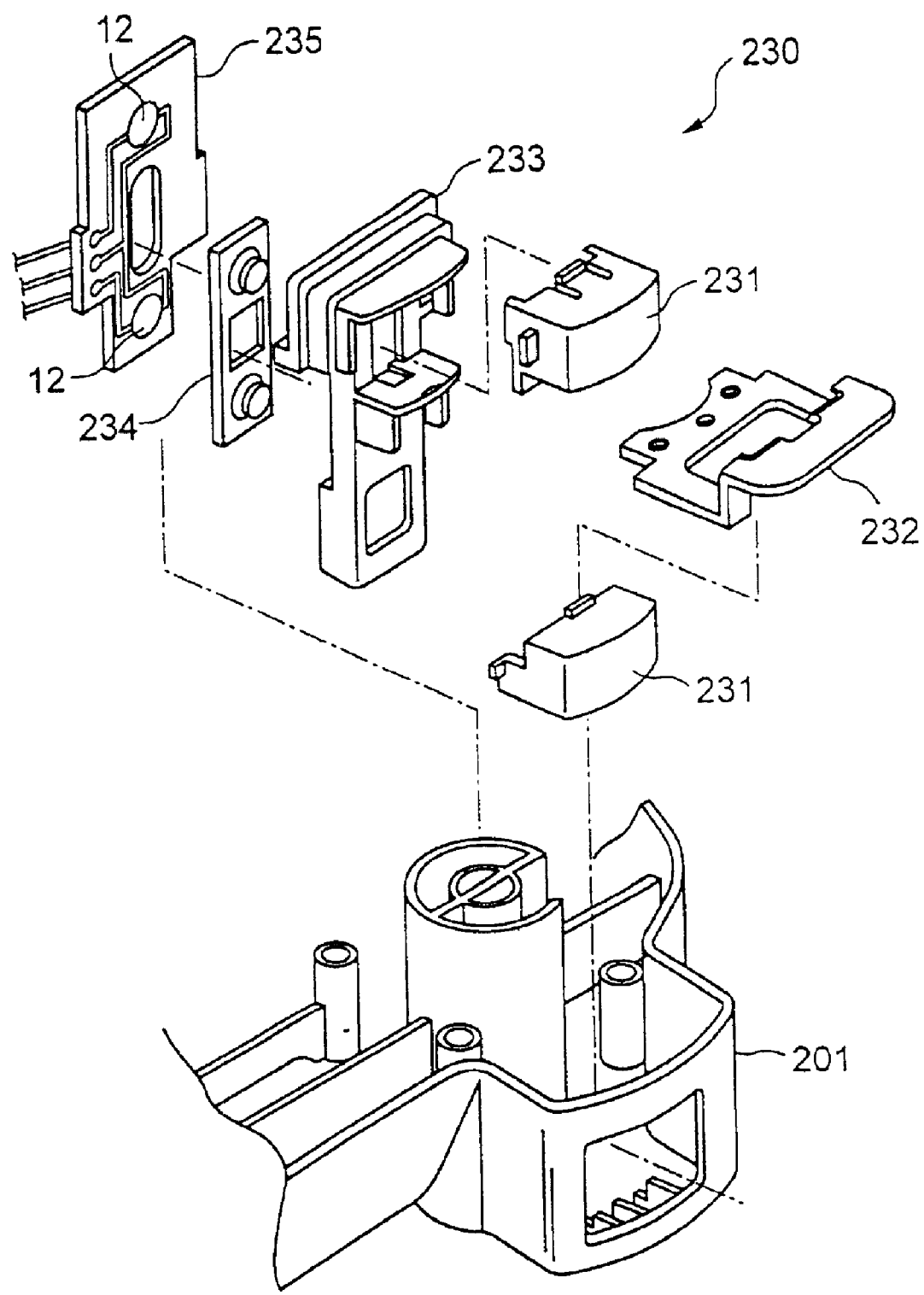
FIG. 18 is an exploded perspective view of an embodiment of a third control part of the controller.

FIG. 18 is an exploded perspective view of the third control part of the controller.

The third control part 230 consists of two control buttons 231, a spacer 232 for positioning these control buttons 231 within the interior of the controller 200, a holder 233 that supports these control buttons 231, an elastic body 234 and an internal board 235, having a structure wherein resistors 40 are attached to appropriate locations upon the internal board 235 and conducting members 50 are attached to the rear surface of the elastic body 234.

The overall structure of the third control part 230 also already has been made public knowledge in the publication of unexamined Japanese patent application No. JP-A-H8-163672. The individual control buttons 231 can be pushed in while being guided by the spacer 232. The pushing pressure when buttons 231 are pressed acts via the elastic body 234 on the pressure-sensitive device consisting of a conducting member 50 and resistor 40. The electrical resistance value of the pressure-sensitive device varies depending on the magnitude of the pushing pressure it receives.

It is noted that the fourth control part 240 shown in FIG. 8 has the same structure as that of the third control part 230 described above.

While an embodiment was described above, the present invention may also assume the following alternative embodiment. In the above embodiment, the pressure-sensing value as pushed by the user is used as is. However, in order to correct for differences in the body weights of users or differences in how good their reflexes are, it is possible to correct the maximum value of the user pressure-sensing value to the maximum game pressure-sensing value set by the program, and intermediate values may be corrected proportionally and used. This type of correction is performed by preparing a correction table. In addition, the user pressure-sensing value can be corrected based upon a known function. Moreover, the maximum value of the user pressure-sensing value rate of change may be corrected to the maximum game pressure-sensing value rate of change set in the program, and intermediate values can be proportionally corrected and used. For more details about this method, refer to the present inventors' Japanese patent application No. 2000-40257 and the corresponding PCT application JP/(Applicant file reference No. SC00097).

As described above, in this embodiment, the object is moved at a velocity based on the pressure-sensing value, so the user interface can be improved.

What is claimed is:

1. A recording medium on which is recorded a computer-readable and executable software program that performs processing by taking as instructions an output from a controller of a computer, said controller having one or more pressure-sensitive means, wherein said software program comprises a processing program that moves an object within a screen of a monitor of the computer depending on the output of said controller, wherein a distance moved by the object is determined by an output value of said controller indicative of a highest pushing pressure exerted on at least one of said one or more pressure-sensitive means during a current operating cycle of said one or more pressure-sensitive means, wherein the movement of the object within the screen of the monitor represents an action executed in a three-dimensional space; and wherein a distance of the movement of said object on the screen of the monitor is determined depending on a rate of change per unit time of the output value of said controller.

2. The recording medium according to claim 1, wherein the distance of the movement of the object is determined by multiplying a current position of said object by a rate of change coefficient correlated with the output value of said controller.

3. The recording medium according to claim 1, wherein the action executed in a three-dimensional space is a jumping action.

4. A method of moving an object displayed on a screen of a monitor of a computer having a controller which has one or more pressure-sensitive means, comprising the steps of:
   sensing a pushing pressure exerted by a user on said controller of the computer by said one or more pressure-sensitive means;
   determining a pressure-sensing output signal depending on said sensed pressure; and
   moving the object within the screen depending on a magnitude of said pressure-sensing output signal, wherein the magnitude is indicative of a highest pushing pressure exerted on said pressure-sensitive means during a current operating cycle of said pressure-sensitive means and the movement of the object within the screen of the monitor represents an action executed in a three-dimensional space;
   wherein
   in said step of moving the object within the screen depending on the magnitude of said pressure-sensing output signal, a distance of movement of the object is determined depending on the rate of change per unit time of the magnitude of said pressure-sensing output signal.

5. The method of moving an object according to claim 4, wherein the action executed in a three-dimensional space is a jumping action.

6. A method of moving an object displayed on a screen of a monitor of a computer having a controller which has one or more pressure-sensitive means, comprising the steps of:
   sensing a pushing pressure exerted by a user on said controller of the computer by said one or more pressure-sensitive means;
   determining a pressure-sensing output signal depending on said sensed pressure; and
   moving the object within the screen depending on a magnitude of said pressure-sensing output signal, wherein the magnitude is indicative of a highest pushing pressure exerted on said pressure-sensitive means during a current operating cycle of said pressure-sensitive means and the movement of the object within the screen of the monitor represents an action executed in a three-dimensional space;
   wherein
   in said step of moving said object within the screen depending on the magnitude of said pressure-Sensing output signal,
   a position of movement of said object is determined by multiplying a current position of said object by a velocity coefficient that depends on the magnitude of said pressure-sensing signal.

7. A computer to which a monitor having a screen is interconnected, said computer comprising:
   a controller which has pressure-sensitive means;
   one or more means for sensing a pushing pressure exerted by a user on said controller;
   means for determining a pressure-sensing output signal depending on said pushing pressure;
   means for moving an object within said screen displayed on said monitor depending on a magnitude of said pressure-sensing output signal, wherein said means for sensing indicates a highest pushing pressure exerted on said one or more means for sensing a pushing pressure during a current operating cycle of said pressure-sensitive means and the movement of the object within said screen represents an action executed in a three-dimensional space; and
   means for determining a distance of movement of the object depending on a rate of change per unit time of the magnitude of said pressure-sensing output signal.

8. The computer according to claim 7, wherein said means for determining a distance of movement of the object multiplies a current position of said object by a rate of change coefficient correlated with the magnitude of said pressure-sensing output signal.

9. The computer according to claim 7, wherein the action executed in a three-dimensional space is a jumping action.

10. A recording medium on which is recorded a computer-readable and executable software program that performs processing by taking as instructions an output from a controller of a computer, said controller having one or more pressure-sensitive means, wherein
    said software program comprises a processing program that moves an object within a screen of a monitor of the computer depending on the output of said controller, wherein a distance moved by the object is determined by an output value of said controller indicative of a highest pushing pressure exerted on at least one of said one or more pressure-sensitive means during a current operating cycle of said one or more pressure-sensitive means, wherein the movement of the object within the screen of the monitor represents an action executed in a three-dimensional space; and
    wherein a vertical distance of the movement of the object is determined depending on a rate of change per unit time of the output value of said controller by multiplying a current vertical position of said object by a rate of vertical change coefficient correlated with the output value of said controller, successive rate of vertical change coefficients being stored for manipulation to reverse the distance of vertical movement after a vertical apex of the object is reached.

11. The recording medium according to claim 10, wherein said software program determines that a vertical apex has been reached when a component of the pushing pressure exerted on said one or more pressure-sensitive means indicating the vertical distance of movement is released.

12. A method of moving an object displayed on a screen of a monitor of a computer having a controller which has one or more pressure-sensitive means, comprising the steps of:
    sensing a pushing pressure exerted by a user on said controller of the computer by said one or more pressure-sensitive means;
    determining a pressure-sensing output signal depending on said sensed pressure; and
    moving the object within the screen depending on a magnitude of said pressure-sensing output signal, wherein the magnitude is indicative of a highest pushing pressure exerted on said pressure-sensitive means during a current operating cycle of said pressure-sensitive means and the movement of the object within the screen of the monitor represents an action executed in a three-dimensional space;

wherein in said step of moving said object within the screen depending on the magnitude of said pressure-sensing output signal, a vertical position of movement of said object is determined by multiplying a current position of said object by a vertical velocity coefficient that depends on the magnitude of said pressure-sensing signal, successive vertical velocity coefficients are stored, and the stored vertical velocity coefficients are used to reverse the vertical position of movement after determining that a vertical apex of the object is reached.

13. The recording medium according to claim 12, wherein the vertical apex is determined to be reached when a component of the pushing pressure exerted on said one or more pressure-sensitive means indicating the vertical distance of movement is released.

14. A computer to which a monitor having a screen is interconnected, said computer comprising:

a controller which has pressure-sensitive means;

one or more means for sensing a pushing pressure exerted by a user on said controller;

means for determining a pressure-sensing output signal depending on said pushing pressure;

means for moving an object within said screen displayed on said monitor depending on a magnitude of said pressure-sensing output signal, wherein said means for sensing indicates a highest pushing pressure exerted on said one or more means for sensing a pushing pressure during a current operating cycle of said pressure-sensitive means and the movement of the object within said screen represents an action executed in a three-dimensional space; and means for determining a vertical distance of movement of the object depending on a rate of change per unit time of the magnitude of said pressure-sensing output signal by multiplying a vertical position of said object by a vertical distance rate of change coefficient correlated with the magnitude of said pressure-sensing output signal, storing successively determined vertical distance rate of change coefficients, and reversing the vertical position by manipulating the stored vertical distance rate of change coefficients after a vertical apex of the object is reached.

15. The computer according to claim 14, wherein the vertical apex is determined to be reached when a component of the pushing pressure exerted on said one or more means for sensing a pushing pressure indicating the vertical distance of movement is released.

16. A computer executing a software program that performs processing by taking as instructions an output from a controller of a computer, said controller having one or more pressure-sensitive means, wherein said software program comprises a processing program that moves an object within a screen of a monitor of the computer depending on the output of said controller, wherein a distance moved by the object is determined by an output value of said controller indicative of a highest pushing pressure exerted on at least one of said one or more pressure-sensitive means during a current operating cycle of said one or more pressure-sensitive means, wherein the movement of the object within the screen of the monitor represents an action executed in a three-dimensional space; and wherein a distance of the movement of said object on the screen of the monitor is determined depending on a rate of change per unit time of the output value of said controller.

* * * * *